(12) United States Patent
Inoue et al.

(10) Patent No.: US 8,770,330 B2
(45) Date of Patent: Jul. 8, 2014

(54) EXTERIOR SHROUD MEMBER FOR A SADDLE-TYPE VEHICLE, AND VEHICLE INCORPORATING THE SAME

(75) Inventors: Yusuke Inoue, Saitama (JP); Shiro Yama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/542,812

(22) Filed: Jul. 6, 2012

(65) Prior Publication Data

US 2013/0015007 A1   Jan. 17, 2013

(30) Foreign Application Priority Data

Jul. 11, 2011  (JP) ................................. 2011-153052

(51) Int. Cl.
  *B62D 24/00*    (2006.01)
(52) U.S. Cl.
  USPC ........................... 180/68.4; 180/218; 280/833
(58) Field of Classification Search
  USPC ........ 180/218, 225, 68.4, 68.6; 220/562, 563; 296/180.1; 280/833, 835
  See application file for complete search history.

(56) References Cited

U.S. PATENT DOCUMENTS

| | | | | |
|---|---|---|---|---|
| 4,712,637 A * | 12/1987 | Mogi et al. | ..................... | 180/219 |
| 6,695,083 B2 * | 2/2004 | Nakamura et al. | ........... | 180/68.1 |
| 7,231,996 B2 * | 6/2007 | Karube et al. | ............. | 180/69.24 |
| 7,475,749 B2 * | 1/2009 | Yoshida et al. | .............. | 180/68.1 |
| 7,686,116 B2 * | 3/2010 | Oohashi et al. | ............... | 180/219 |
| 7,690,463 B2 * | 4/2010 | Okamoto | ..................... | 180/68.3 |
| 7,743,862 B2 * | 6/2010 | Togawa et al. | ............... | 180/68.4 |
| 8,256,556 B2 * | 9/2012 | Inose et al. | .................... | 180/219 |
| 8,281,889 B2 * | 10/2012 | Inoue | ............................ | 180/219 |
| 8,302,723 B2 * | 11/2012 | Mitomi et al. | ................ | 180/229 |

FOREIGN PATENT DOCUMENTS

JP        2005-255169 A       9/2005

* cited by examiner

*Primary Examiner* — John Walters
*Assistant Examiner* — Brian Swenson
(74) *Attorney, Agent, or Firm* — Carrier Blackman & Associates, P.C.; Joseph P. Carrier; Michael J. McCandlish

(57) ABSTRACT

An exterior member such as a shroud, for a saddle-type vehicle including a head pipe and a main frame extending rearward from the head pipe, has a hook member formed on an inner side thereof. The hook member is configured for being engaged onto the main frame such that the exterior member is supported by the main frame. The exterior member is locked to the vehicle by engaging the hook member onto the main frame, thereby supporting the exterior member on the main frame. Such arrangement enables the exterior member to be affixed to the frame with a simple structure, without detrimentally affecting the external appearance of the vehicle.

15 Claims, 8 Drawing Sheets

EXTERIOR SHROUD MEMBER FOR A SADDLE-TYPE VEHICLE, AND VEHICLE INCORPORATING THE SAME

CROSS-REFERENCE TO RELATED APPLICATIONS

The present invention claims priority under 35 USC 119 based on Japanese patent application No. 2011-153052, filed on Jul. 11, 2011. The entire subject matter of this priority document, including specification claims and drawings thereof, is incorporated by reference herein.

BACKGROUND OF THE INVENTION

1. Field of the Invention

The present invention relates to an exterior member for a saddle-type vehicle, and to a vehicle incorporating the same. More particularly, the present invention relates to an exterior member having a hook member formed on an inner portion thereof, and to a vehicle incorporating the same.

2. Description of the Background Art

There is a known saddle-type vehicle in which radiator shrouds, as exterior members, for covering a radiator from lateral sides are each bolted onto a fuel tank, the radiator, and a mounting stay extended from a frame. An example of such saddle-type vehicle is disclosed in the Japanese Patent Laid-open No. 2005-255169.

However, in the conventional saddle-type vehicle, such as that disclosed in the Japanese Patent Laid-open No. 2005-255169, there is a problem in that the frame becomes heavier and the structure becomes complicated since the mounting stay exclusive for mounting the radiator shroud is extended from the frame. In addition, since the radiator shroud and the mounting stay are spaced apart from each other in a vehicle width direction, the fastening portion of the radiator shroud that contacts the mounting stay has to be made deeper. This renders the mold of the radiator shroud complicated. In addition, as the fastening portion of the shroud is enlarged in size, there would be a comparatively large hole in the external appearance of the vehicle. Therefore, enhancement of the degree of freedom in design is desired.

The present invention has been made in consideration of the above-mentioned circumstances. It is one of the objects of the present invention to enable an exterior member for a saddle-type vehicle to be fixed with a simple structure and without influencing the external appearance of the vehicle.

SUMMARY OF THE INVENTION

In order to achieve the above objects, the present invention according an embodiment thereof provides an exterior member for a saddle-type vehicle including a body frame (15) having a head pipe (14) and additional frame sections (15) extending rearwardly from the head pipe (14), and the exterior member (37), wherein the exterior member (37) has a hook member (75) formed on an inner side thereof. The hook member (75) is capable of being engaged onto the additional frame sections (15) so that the exterior member (37) is supported by the frame (10), and the exterior member (37) is locked to the vehicle by hooking the hook member (75) onto the additional frame sections (15) and supporting the exterior member (37) by the frame (10).

According to this configuration, in a vehicle provided with the head pipe, the frame extending rearward from the head pipe, and the exterior member, the exterior member has the hook member formed on an inner side thereof and the hook member is capable of being engaged onto the frame so that the exterior member is supported by the frame, and the exterior member is locked to the vehicle by hooking the hook member onto the frame and supporting the exterior member thereby. Thus, the exterior member can be fixed to the vehicle with a simple structure, without providing a dedicated member, such as a stay on the frame. In addition, since the hook member or a part thereof does not require any hole be formed thereon for mounting of the hook member on the frame, the exterior member is fixed onto the frame without influencing the external appearance of the vehicle.

In the above-mentioned configuration, the additional frame sections (15) may include a pair of left and right main frames (15).

In this case, the exterior member is supported by hooking onto the pair of left and right main frames, so that the exterior member can be supported more firmly.

In addition, the configuration may be such that a fuel tank (50) is disposed between the main frames (15), and the fuel tank (50) is disposed on an upper side of a hook-supporting section (80) of the main frame onto which the hook member (75) is engaged.

In this case, since the fuel tank is disposed between the main frames and the fuel tank is disposed on the upper side of the hook-supporting section at which the hook member is engaged, the hook member can be locked by the fuel tank, and therefore the hook member can be prevented from being disengaged from the main frame.

The fuel tank (50) may have a side surface (52A) formed with a recess (57), and the hook member (75) may be inserted between the main frame (15) and the recess (57) and is slid along the main frame (15).

In this case, since the hook member is inserted between the main frame and the recess of the side surface of the fuel tank and is slid along the main frame, the exterior member can be attached and detached while the fuel tank is mounted on the vehicle, so that good maintainability is secured.

Further, the configuration may be such that, when viewed in a side view, the recess (57) of the fuel tank (50) overlaps with the exterior member (37) when the exterior member (37) is mounted in a desired position.

In this case, when viewed in a side view, since the recess of the fuel tank overlaps with the exterior member when the exterior member is mounted in a desired position, the recess is hidden by the exterior member so as to be invisible from the outside. Accordingly, the exterior member can be fixed without influencing the external appearance of the vehicle.

The exterior member (37) may be supported by hooking onto the frame (15) at the hook-supporting section (80), and also supported by being fastened to the vehicle at a plurality of fastening portions (63, 64, 74), and the hook-supporting section (80) may be disposed substantially at a center of the plurality of fastening portions (63, 64, 74).

In this case, the exterior member is supported by hooking onto the frame at the hook-supporting section, and also supported by being fastened to the vehicle at the plurality of fastening portions, and the hook-supporting section is disposed substantially at the center of the plurality of fastening portions. It is therefore unlikely that a large force acts on the hook-supporting section, and the exterior member can be supported firmly.

A radiator (5) may be provided on the inner side of the exterior member (37), and the exterior member (37) may be supported by being fastened to the radiator (5) and the fuel tank (50).

In this case, since the exterior member is supported by being fastened to the radiator and the fuel tank, it is unnecessary to provide such a member as a stay for supporting the exterior member. Accordingly, the exterior member can be fixed with a simple structure.

Effects of the Invention

The exterior member for the saddle-type vehicle according to the present invention has the hook member formed on the inner side thereof. The hook member is capable of being engaged onto the frame to support the exterior member with the frame, and the exterior member is locked to the vehicle by hooking the hook member onto the frame and supporting the exterior member by the frame. Therefore, the exterior member can be fixed to the vehicle with a simple structure, without providing an exclusive member such as a stay on the frame. In addition, since the hook member or a part thereof does not require any hole be formed thereon, the exterior member can be fixed without influencing the external appearance of the vehicle.

Further, since the exterior member is supported by hooking onto the pair of left and right main frames, the exterior member can be supported more firmly.

Since the fuel tank is disposed on the upper side of the hook-supporting section at which the hook member is engaged, the hook member can be locked by the fuel tank, so that the hook member can be prevented from being disengaged from the frame.

Since the hook member is inserted between the main frame and the recess of the side surface of the fuel tank and is slid along the main frame, the exterior member can be attached and detached with the fuel tank kept mounted on the vehicle, so that good maintainability is secured.

Since the recess of the fuel tank is hidden by the exterior member so as to be invisible from the outside, the exterior member can be fixed without influencing the external appearance of the vehicle.

Since the hook-supporting section is disposed substantially at the center of the plurality of fastening portions and a large force is unlikely to act on the hook-supporting section, the exterior member can be supported firmly.

Since the exterior member is supported by being fastened to the radiator and the fuel tank, it is unnecessary to provide an additional member, such as a stay, for supporting the exterior member. Accordingly, the exterior member can be fixed with a simple structure.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Figure 1:
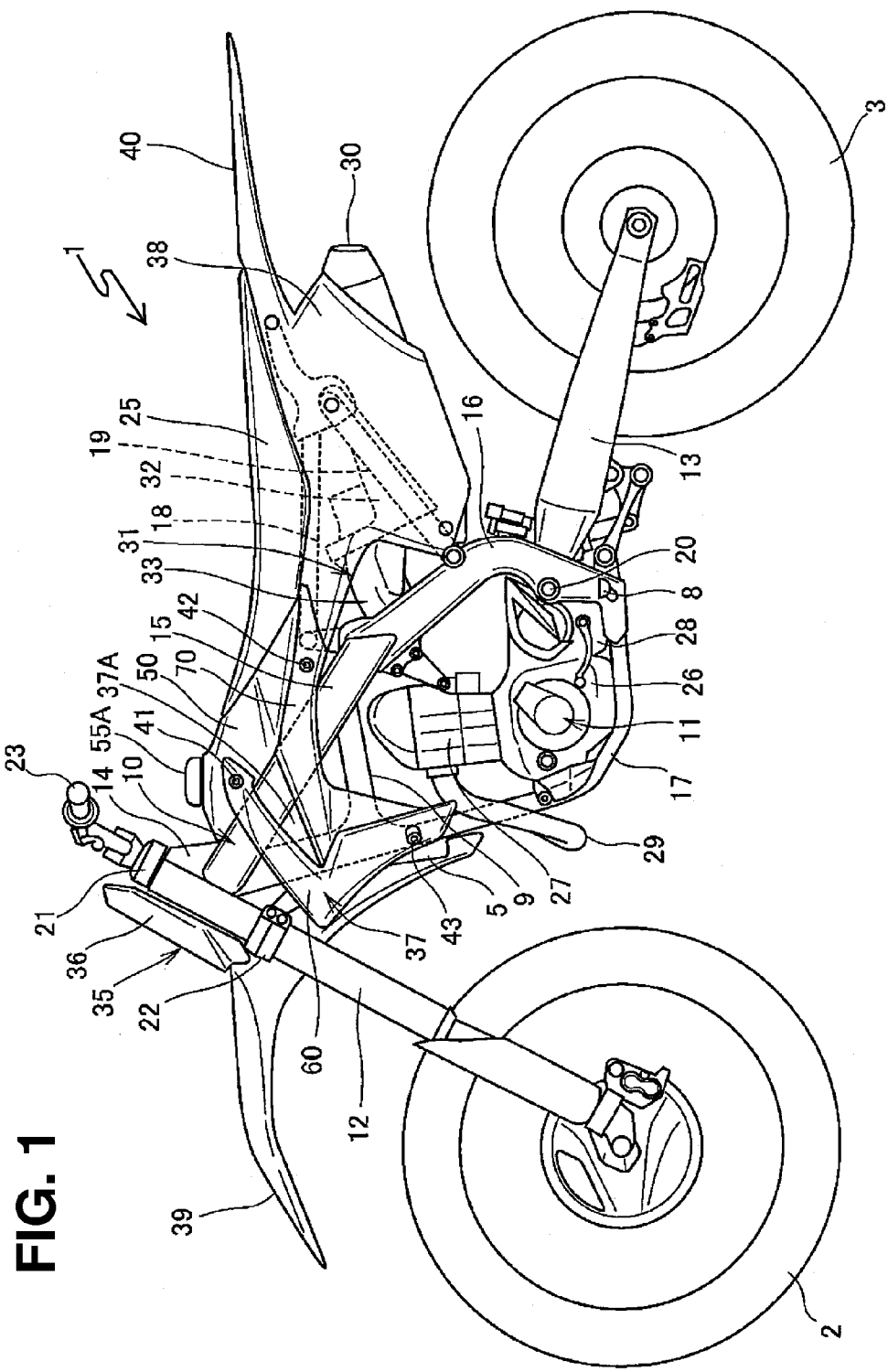
FIG. 1 is a left side view of a motorcycle according to an embodiment of the present invention.

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Now, referring to the drawings, a motorcycle according to an illustrative embodiment of the present invention will be described. Incidentally, the upward, downward, forward, rearward, leftward and rightward directions in the following description are the directions as viewed from a driver of the vehicle.

Figure 2:
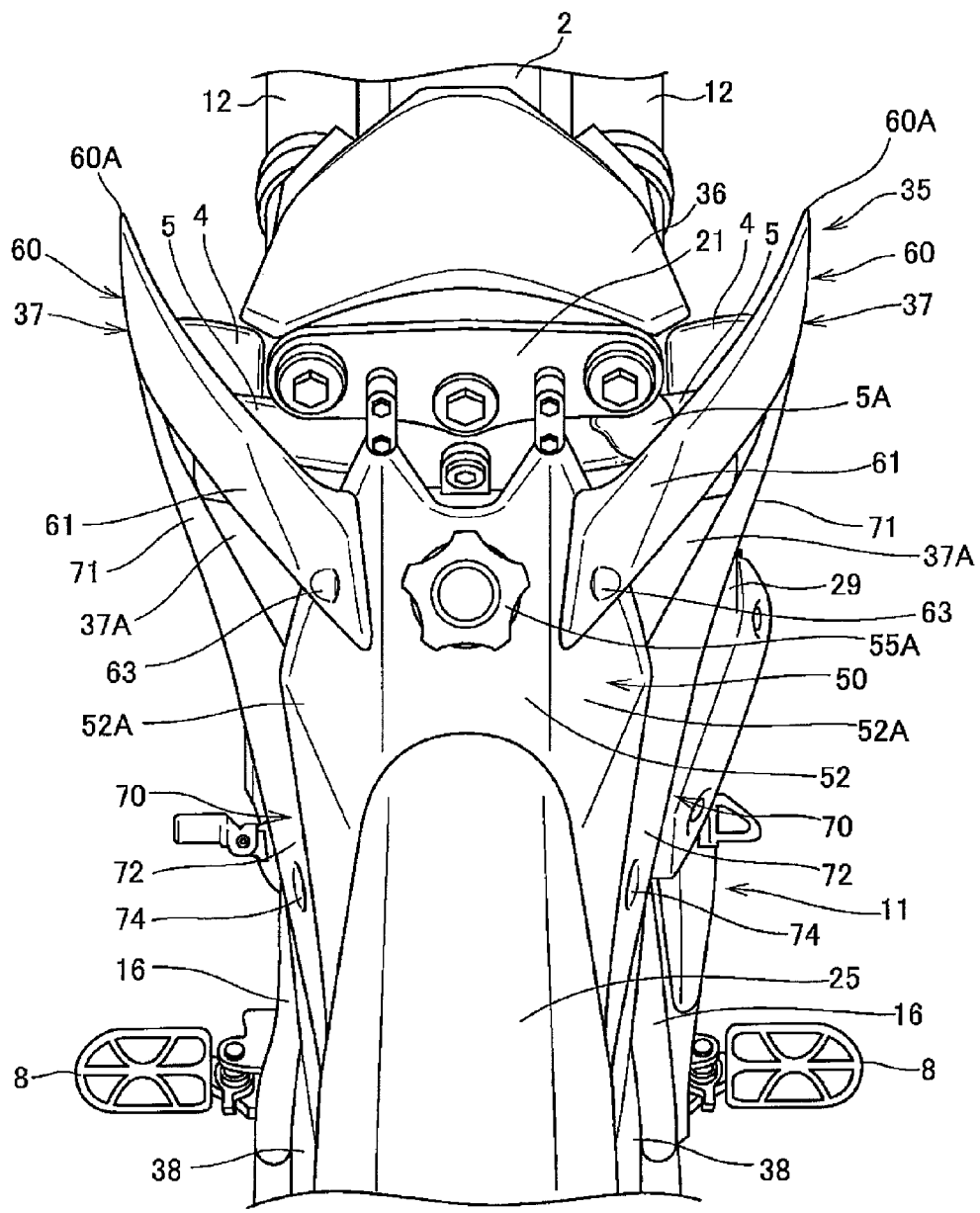
FIG. 2 is a plan view of a front portion of the motorcycle, as viewed from above.

FIG. 1 is a left side view of the motorcycle according to the illustrative embodiment of the present invention. FIG. 2 is a plan view of a front portion of the motorcycle, as viewed from above.

The motorcycle 1 of the present invention is a saddle-type or an off-road type vehicle. The motorcycle 1 includes an engine 11 disposed at the center of a body frame 10 in a front and rear direction (longitudinal direction) of the vehicle, a front fork 12 supporting a front wheel 2 steerably supported at the front end of the body frame 10, and a swing arm 13 supporting a rear wheel 3 provided at a lower portion of a rear portion of the body frame 10.

The body frame 10 includes: a head pipe 14 supporting a pair of left and right portions of the front fork 12; a pair of left and right main frames 15 extending rearward and downward from the head pipe 14; a pair of left and right pivot plates 16 extending rearward and downward from the rear ends of the main frames 15 and then bent toward the front and lower side to extend downward; a down frame 17 extending downward from the head pipe 14, branching off left and right at the front of the engine 11, extending under the engine 11, and connected to the lower ends of the pivot plates 16; a pair of left and right seat rails 18 extending substantially horizontally and rearward from upper portions of the pivot plates 16; and a pair of left and right rear pipes 19 bridging vertically intermediate portions of the pivot plates 16 and rear portions of the seat rails 18. The down frame 17 and the main frames 15 are interconnected by a pair of left and right reinforcement pipes 9 extending over the engine 11.

A pivot shaft 20 penetrating the left and right pivot plates 16 in the vehicle width direction is provided on the pivot plates 16. The swing arm 13 is swingably supported by the pivot shaft 20. The rear wheel 3 is rotatably supported at the rear end of the swing arm 13. A pair of left and right steps 8 is provided on lower portions of the pivot plates 16.

A steering shaft (not shown) is rotatably supported by the head pipe 14. The front fork 12 is connected to a top bridge 21 and a bottom bridge 22 which are respectively connected to the upper end and lower end of the steering shaft. A steering handle 23 (not shown in FIG. 2) is attached to the top bridge 21.

A fuel tank 50 is fixed on the upper side of the head pipe 14 so as to lie along the main frames 15. A seat 25 for a driver of the vehicle is arranged continuous with a rear portion of the fuel tank 50, and extends rearward. The seat 25 is supported by the seat rails 18.

The engine 11 is a water-cooled four-cycle single-cylinder engine. The engine 11 includes a crankcase 26 in which a crankshaft (not shown) extending in a vehicle width direction is housed. A cylinder 27 extends upwardly while being slightly tilted forward from a front portion of the crankcase 26. The engine 11 is supported between the main frames 15 and the down frame 17. A transmission unit 28 is provided at a rear portion of the crankcase 26 in an integral fashion.

An exhaust pipe 29 is connected to a front portion of the cylinder 27. The exhaust pipe 29 is bent to the right side, extends rearward, and branches off into two branches, which are connected respectively to a pair of left and right mufflers 30 provided below the rear pipes 19.

An intake system 31 for supplying a fuel and air to the engine 11 is disposed on a rear side of the cylinder 27. An air cleaner box 32 which is an outside air intake port of the intake system 31 is disposed in a space surrounded by the left and right seat rails 18 and the left and right rear pipes 19. A connecting tube 33 extending toward the cylinder 27 side is connected to a front portion of the air cleaner box 32.

A plate-shaped radiator 5 extending vertically is provided in front of the cylinder 27. The radiator 5 is divided and disposed in the form of a pair on the left and right sides of the down frame 17, and is fixed to the down frame 17.

The motorcycle 1 has a body cover 35 made of resin. The body cover 35 includes a front cover 36 covering the front side of the head pipe 14, a pair of left and right shrouds 37 (radiator shrouds) covering an upper portion of the down frame 17 and the lateral sides of the main frames 15, and a pair of left and right side covers 38 disposed below the seat 25 covering the lateral sides of the air cleaner box 32 and the mufflers 30 etc.

A front fender 39 is fixed to the bottom bridge 22, and a rear fender 40 is provided behind the seat 25.

Figure 3:
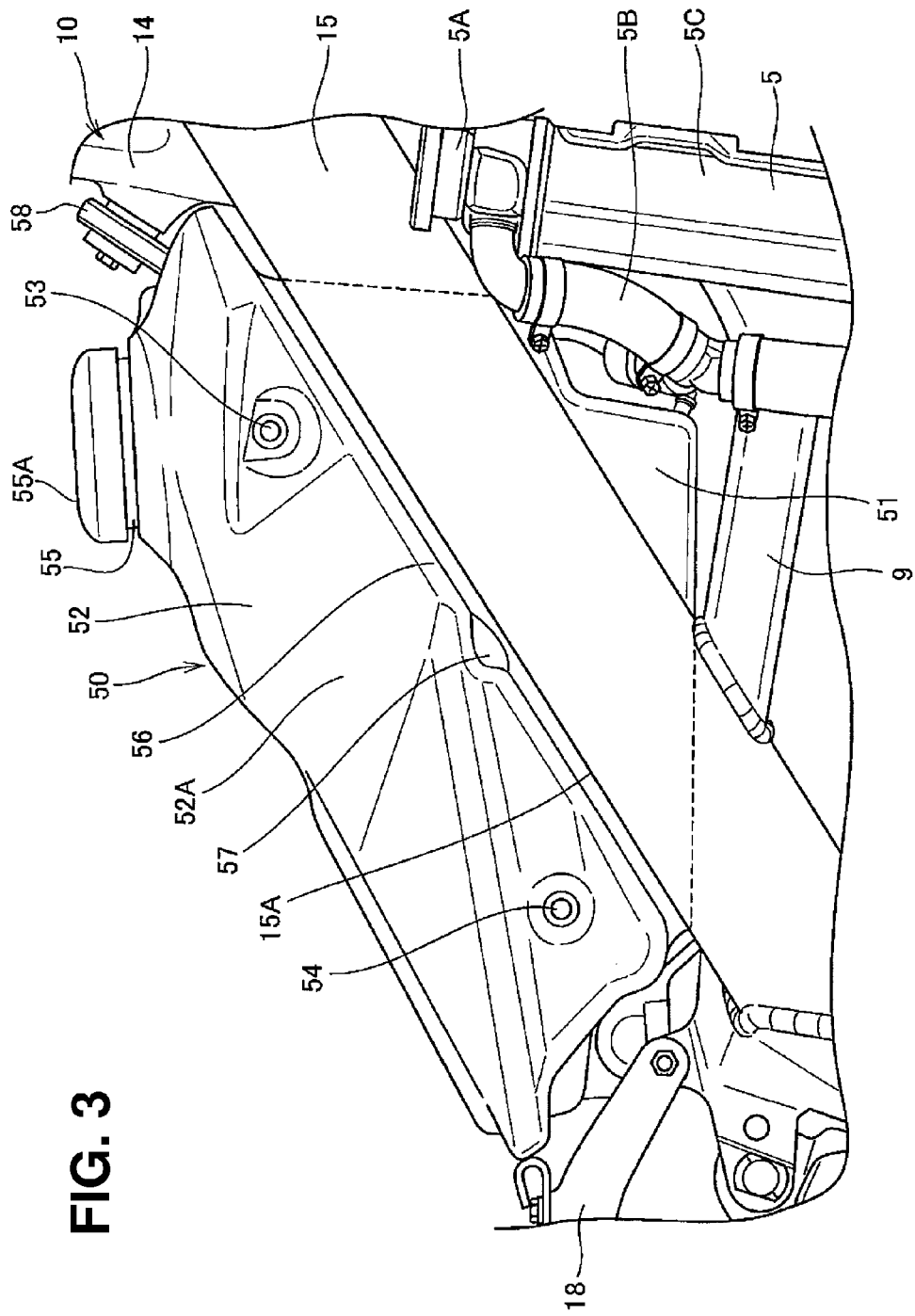
FIG. 3 is a right side view of the motorcycle showing a state in which a shroud and a seat have been detached to a frame of the motorcycle.

FIG. 3 is a right side view of the motorcycle 1, showing a state in which the shrouds 37 and the seat 25 are detached.

The left and right main frames 15 extend rectilinearly rearward and downward. The fuel tank 50 is disposed across the left and right main frames 15. The fuel tank 50 includes a tank lower portion 51 interposed between the left and right main frames 15, and a tank upper portion 52 located above the left and right main frames 15. The fuel tank 50 is made of resin.

A cap 55A that can be attached to and detached from a fuel filler 55 is provided on the upper surface of a front portion of a tank upper portion 52. The tank upper portion 52 has, at each side surface 52A thereof, a front fixing portion 53 and a rear fixing portion 54 to which bolts 41 and 42 (see FIG. 4) for fixing the shroud 37 to the fuel tank 50 are fastened. The front fixing portion 53 is located below the fuel filler 55, while the rear fixing portion 54 is located at a rear portion of the tank upper portion 52.

A lower edge portion 56 of the side surface 52A of the tank upper portion 52 extends rectilinearly along the upper surface 15A of the main frame 15. The lower edge portion 56 is formed with a recess 57 which is hollowed to the inner side of the fuel tank 50. The recess 57 is formed at an intermediate portion of the fuel tank 50 in the front and rear direction, and is located between the front fixing portion 53 and the rear fixing portion 54.

The fuel tank 50 is fastened to the body frame 10 via stays 58, which are provided at front portions of the tank upper portion 52, and a plurality of fixing portions (not shown).

A radiator cap 5A for closing a cooling water supply port is provided at an upper portion of the radiator 5. In addition, a cooling water hose 5B, which connects the radiator 5 and the engine 11 to each other, is connected to the rear surface of the upper portion of the radiator 5. At an outer side portion of the radiator 5, a side plate portion 5C extending vertically is provided. Further, a radiator grille 4 for guiding airflow to the radiator 5 and for guarding the front surface of the radiator 5 is arranged at a front surface of the radiator 5.

Figure 4:
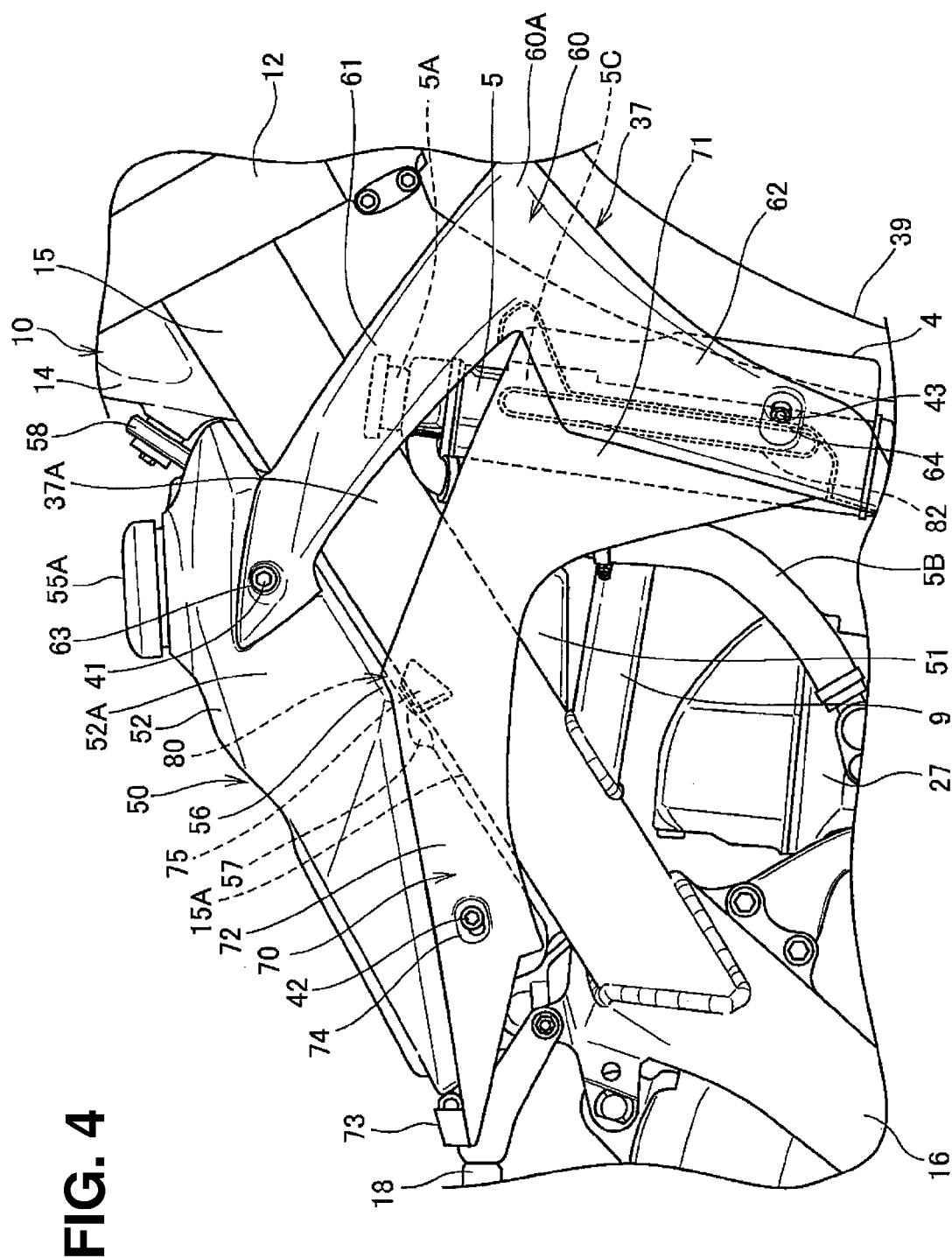
FIG. 4 is a right side view of the motorcycle, showing the vicinity of the shroud.
Figure 5:
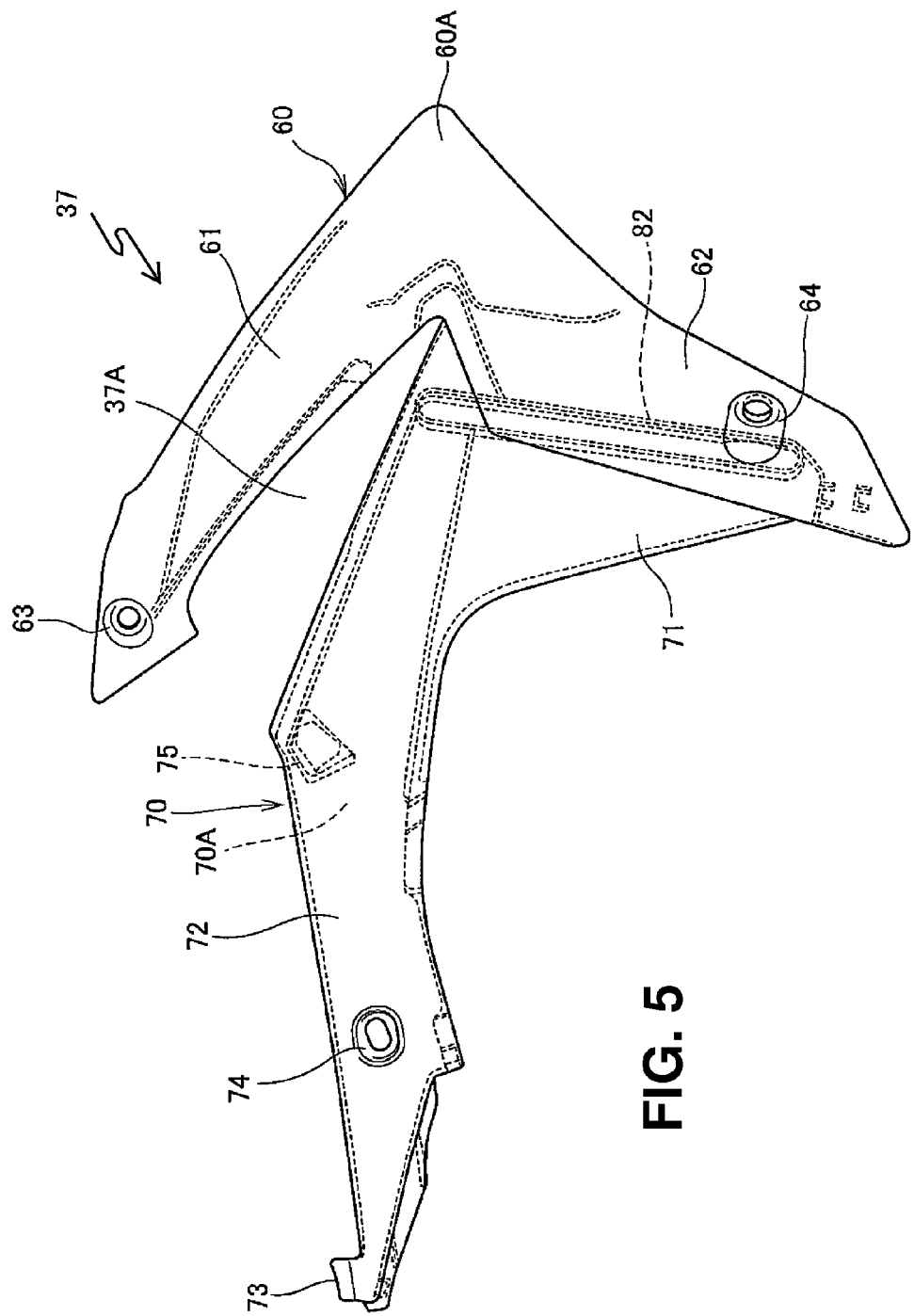
FIG. 5 is a plan view of the shroud on the right side, as viewed from a lateral side.
Figure 6:
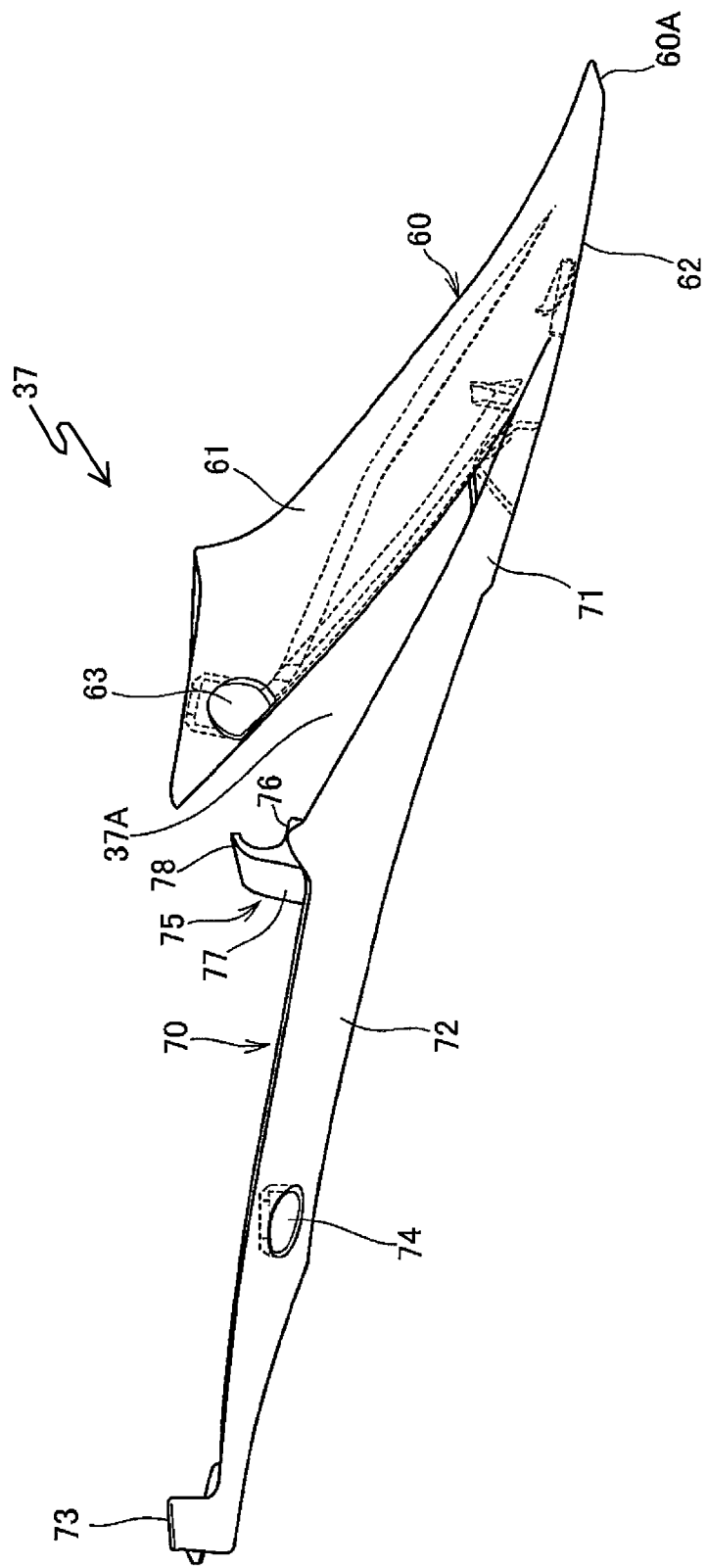
FIG. 6 is a view of the shroud on the right side, as viewed from above.

FIG. 4 is a right side view of the motorcycle 1, showing the vicinity of the shroud 37. FIG. 5 is a plan view of the shroud 37 on the right side, as viewed from a lateral side. FIG. 6 is a view of the shroud 37 on the right side, as seen from above. The left and right shrouds 37 are configured substantially in left-right symmetry. The shroud 37 on the right side is described herein in detail.

The shroud 37 is a plate-shaped cover for introducing air flowing in from the front side to the radiator 5. As shown in FIGS. 2 and 4 through 6, the shroud 37 projects obliquely outward toward the front side from the side surface of the fuel tank 50. Further, the shroud 37 passes by an outer side face of the radiator 5 to extend forward beyond the radiator 5.

The shroud 37 has a front cover section 60 extending vertically and covering a lateral side of the radiator 5, and a rear cover section 70 extending rearwardly from a substantially lower portion of the front cover section 60 to a rear portion of the fuel tank 50. The front cover section 60 and the rear cover section 70 cooperate to form a main body of the shroud 37.

The front cover section 60 has an upper portion 61 extending obliquely outward, toward the front and lower side, from the front fixing portion 53 of the tank upper portion 52 while spreading in a vehicle width direction, and a lower portion 62 extending downward from the lower end of the upper portion 61 and covering the side plate portion 5C of the radiator 5. The upper portion 61 covers an upper part of the main frame 15 and an upper part of the radiator 5, and joins the lower portion 62 at a vertex portion 60A on the front side of the radiator 5. The vertex portion 60A is a portion which protrudes forward beyond the front surface of the radiator 5. The lower portion 62 is formed with a rib 82 extending vertically. The rib 82 makes contact with the side plate portion 5C of the radiator 5, so as to lock the shroud 37 onto the radiator 5.

The upper portion 61 has a fixing hole portion 63 (fastening portion) formed at upper end part thereof. The upper portion 61 is fastened through the fixing hole portion 63 thereof to the front fixing portion 53 of the tank upper portion 52 by a bolt 41 (FIG. 4). The lower portion 62 has a fixing hole portion 64 (fastening portion) formed at a lower end part thereof. The lower portion 62 is fastened through the fixing hole portion 64 to a side surface of a lower portion of the radiator 5 by a bolt 43 (FIG. 4).

The rear cover section 70 has a central portion 71 and a rear extension portion 72. The central portion 71 is continuous with the rear edge of the lower portion 62 of the front cover section 60 and covers the side plate portion 5C of the radiator 5 and the cooling water hose 5B. The rear extension portion 72 extends rearwardly from an upper part of the central portion 71 and covers the main frame 15 and a rear part of the tank upper portion 52. The rear extension portions 72 are inclined such that their width in a vehicle width direction decreases along the rearward direction.

An opening 37A is formed between the upper edge of a front part of the rear extension portion 72 and the lower edge of the upper portion 61 of the front cover section 60. An airflow induced by the traveling of the vehicle is permitted to pass rearward through the opening 37A, whereby air is efficiently guided to the radiator 5.

The rear extension portion 72 is formed at its rear end part with a projecting wall 73 projecting upward. The projecting wall 73 makes contact with the bottom surface of the seat 25. A fixing hole portion 74 (fastening portion) to be fastened to the rear fixing portion 54 of the tank upper portion 52 by the bolt 42 (FIG. 4) is formed on the front side of the projecting wall 73 at the rear part of the rear extension portion 72. An inner side surface 70A of the rear extension portion 72 is formed, at an intermediate portion thereof in the front and rear direction, with a hook member 75 that can be engaged onto the main frame 15.

Figure 7:
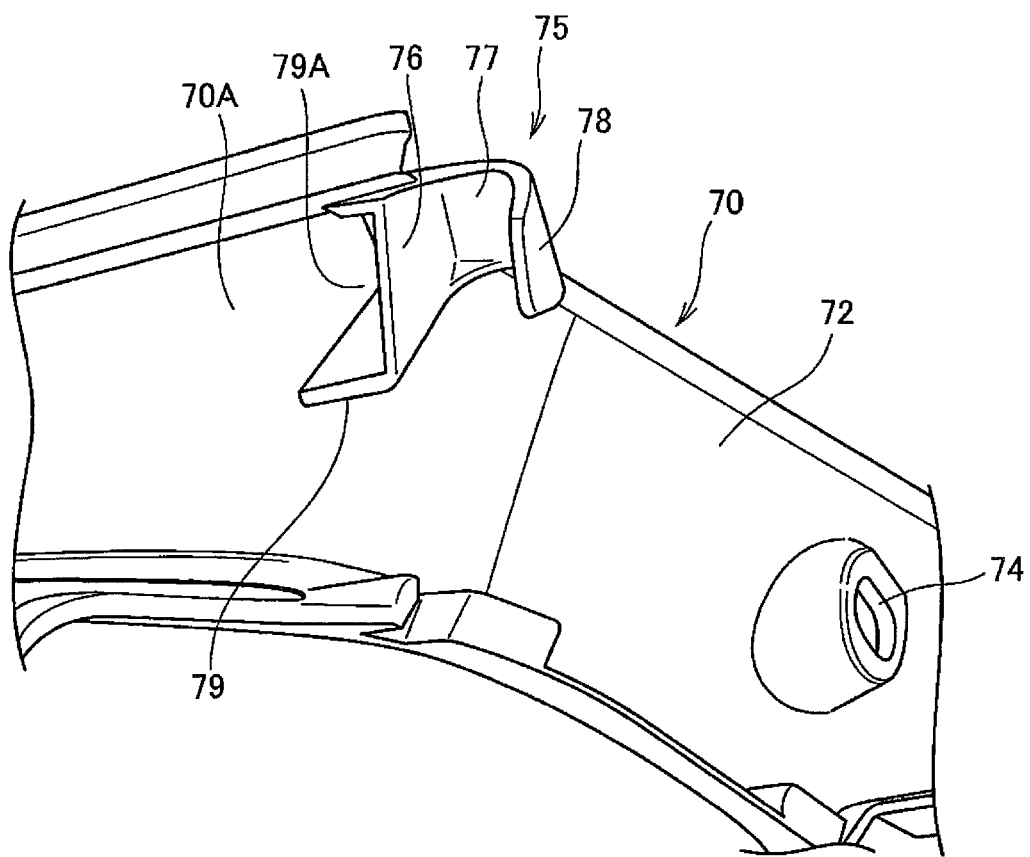
FIG. 7 is a perspective view of a hook member.
Figure 8:
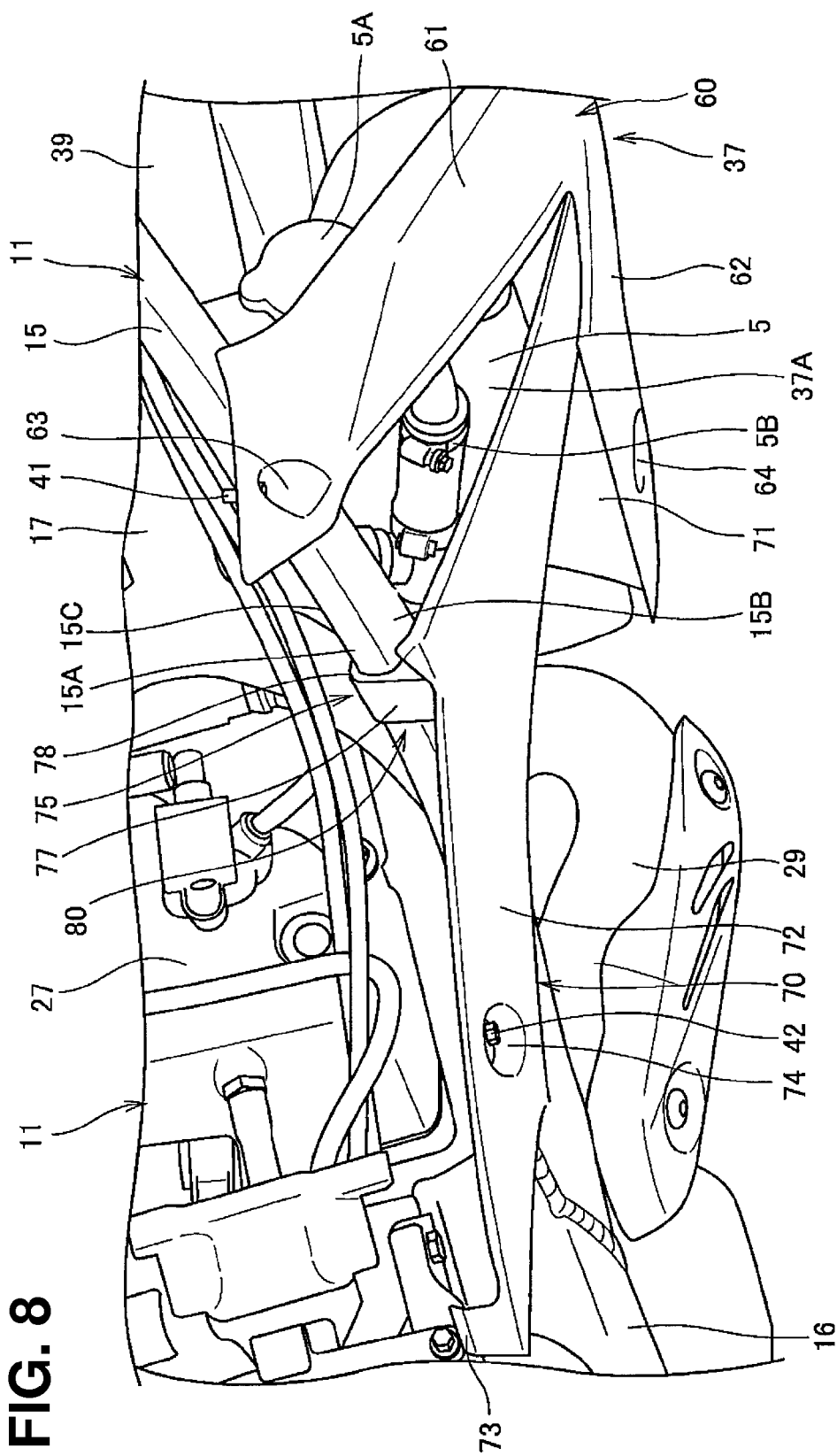
FIG. 8 is a view of a state in which the hook member is mounted, as viewed from above.

FIG. 7 is a perspective view of a central inner portion of the rear cover section 70, including the hook member 75. FIG. 8 is a view of a mounted state of the hook member 75, as viewed from above. Here, in FIG. 8, the fuel tank 50 is omitted from the drawing.

As shown in FIGS. 7 and 8, the hook member 75 is formed in a hook-like shape to be engaged onto the upper surface 15A of the main frame 15 from above. The hook member 75 includes an outer wall portion 76 put into contact with an outer side surface 15B of the main frame 15, an upper wall portion 77 put into contact with the upper surface 15A, and an inner wall portion 78 put into contact with an inner side surface 15C of the main frame 15. The upper wall portion 77 is formed to incline rearward and downward in accordance with the rearward and downward inclination of the main frame 15. In addition, a base portion 79 projecting inward in a vehicle width direction is provided between the outer wall portion 76 and the inner side surface 70A. The base portion 79 is provided with a cavity 79A for weight reduction.

An upper edge portion of the main frame 15 includes a hook-supporting section 80 onto which the hook member 75 is supported by hooking. At the hook-supporting section 80, the upper wall portion 77 of the hook member 75 is clamped between the main frame 15 and the fuel tank 50, whereby the shroud 37 is restricted in movement in a front and rear direction and the vertical direction, and movement of the shroud 37 in the vehicle width direction is restricted by the outer wall portion 76 and the inner wall portion 78 of the hook member 75.

Thus, since the rear extension portion 72 of the shroud 37 can be supported by the main frame 15 at the hook-supporting section 80, the shroud 37 can be fixed to the motorcycle 1 with a simple structure, without providing an exclusive dedicated member, such as a stay, on the main frame 15. In addition, it is not necessary to provide a hole or a through-hole in the hook member 75 of the shroud 37 for inserting a fastening member such as a bolt through the shroud 37. The shroud 37 can thus be fixed without influencing the external appearance of the motorcycle 1.

The hook-supporting section 80 is located between the fixing hole portion 63 and the fixing hole portion 74 of the shroud 37, in the front and rear direction. More specifically, the hook-supporting section 80 is disposed inside a triangular area formed by interconnecting the fixing hole portion 63, the fixing hole portion 74 and the fixing hole portion 64 with straight lines. Therefore, an external force acting on the shroud 37 will be received by the fixing hole portion 63, the fixing hole portion 74 and the fixing hole portion 64 which are so disposed as to surround the periphery of the hook-supporting section 80. Consequently, it is possible to prevent a large force acting on the hook-supporting section 80, and the shroud 37 can be firmly supported.

When the shroud 37 is provided with a plurality of fixing hole portions, it is desirable that the polygonal area formed by interconnecting the fixing hole portions with straight lines be so designed as to maximize the area, and that the hook-supporting section 80 be provided inside the outline of the area.

In addition, the hook-supporting section 80, at which the shroud 37 is supported, is provided behind and adjacent to the opening 37A through which an airflow induced by the traveling of the vehicle passes rearward. The shroud 37 can therefore be effectively prevented from being fluttered by the airflow.

For mounting the shroud 37 onto the vehicle, at a state in which the fuel tank 50 is mounted on the body frame 10 the following procedure may be followed.

First, the hook member 75 is engaged onto the upper surface 15A of the main frame 15 in such a manner that the hook member 75 is inserted into the recess 57 (FIG. 3) of the fuel tank 50 from its side surface.

Next, the shroud 37 is slid forward and upward along the main frame 15. The hook member 75 is thus moved forward and upward over the upper surface 15A, so that it is clamped between the lower edge portion 56 of the fuel tank 50 and the upper surface 15A of the main frame 15.

Thereafter, the bolts 41, 42 and 43 are passed through the fixing hole portions 63, 74 and 64 of the shroud 37 and are fastened respectively to the front fixing portion 53 and the rear fixing portion 54 of the fuel tank 50 and a side surface of the radiator 5, whereby the shroud 37 can be fixed to the vehicle body. After the shroud 37 is fixed, the recess 57 of the fuel tank 50 is covered with the rear extension portion 72 on the rear side of the hook member 75, which makes the recess 57 invisible from the outside, when viewed in side view.

For demounting the shroud 37, the bolts 41, 42 and 43 are detached and the shroud 37 is slid rearward and downward.

As such, the fuel tank 50 is disposed on the upper side of the hook member 75 so as to clamp the hook member 75 between the lower edge portion 56 of the fuel tank 50 and the upper surface 15A of the main frame 15. The hook member 75 can be locked by the fuel tank 50, which prevents the hook member 75 from being disengaged.

In addition, since the shroud 37 can be attached and detached while the fuel tank 50 is mounted on the body frame 10, good maintainability is secured.

Although the support structure for the shroud 37 on the right has been described in detail in the present embodiment, the shroud 37 on the left side is also supported in the same manner as with the right side, and the shroud 37 on the left side is similarly supported by the main frame 15 on the left side at the hook-supporting section 80.

As described above, according to the embodiment of the present invention, the head pipe 14, the main frames 15 extending rearward from the head pipe 14, and the shrouds 37 are provided. The shroud 37 has at its inner side surface 70A the hook member 75 capable of being engaged onto the main frame 15 for supporting the hook member 75 with the main frame 15, and the shroud 37 is locked to the vehicle by hooking the hook member 75 onto the main frame 15 and being supported thereby. Therefore, the shrouds 37 can each be fixed to the vehicle with a simple structure, without providing an exclusive, addition member, such as a stay, on the main frame 15. In addition, since it is not necessary to form a hole in the hook member 75 or in a part thereof, the shrouds 37 can be fixed without influencing the external appearance of the motorcycle 1.

Further, since the pair of left and right shrouds 37 are supported by respectively hooking onto the pair of left and right main frames 15, the shrouds 37 can be supported more firmly. Furthermore, since the main frames 15 are of the so-called twin tube type in which a left-right pair of main frames 15 is provided, and each of the main frames 15 is located outward in the vehicle width direction near the shroud 37, the hook members 75 can be made shorter and can be engaged easily.

The fuel tank 50 is disposed between the left and right main frames 15 and over the upper side of the hook-supporting sections 80 at which the hook members 75 are engaged. The hook members 75 can be locked by the fuel tank 50, whereby the hook members 75 can be prevented from being disengaged from the main frames 15.

Since the hook members 75 are each inserted between the main frame 15 and the recess 57 of the side surface 52A of the fuel tank 50 and slid along the main frame 15, the shrouds 37 can be attached and detached while the fuel tank 50 is mounted on the vehicle, so that good maintainability is ensured.

In addition, the recesses 57 of the fuel tank 50 each overlap with the shroud 37 when the shroud 37 is mounted in position, as viewed in a side view. The recesses 57 are therefore hidden by the shrouds 37 and are invisible from the outside, which makes it possible to fix the shrouds 37 without influencing the external appearance of the motorcycle 1.

The shroud 37 is supported by hooking onto the main frame 15 at the hook-supporting section 80, and is also supported by being fastened to the fuel tank 50 through the fixing hole portion 63, the fixing hole portion 64 and the fixing hole portion 74 at a plurality of locations. The hook-supporting section 80 is disposed generally at the center of the fixing hole portion 63, the fixing hole portion 64 and the fixing hole portion 74. Therefore, it is unlikely that a large force acts on the hook-supporting section 80, and accordingly, the shroud 37 can be supported firmly.

In addition, since the shroud 37 is supported by being fastened to the radiator 5 and the fuel tank 50, it is unnecessary to newly provide such a member as a stay for supporting the shroud 37. Therefore, the shrouds 37 can be fixed with a simple structure.

It should be noted that the above-described embodiment shows one mode of the applications of the present invention, and the present invention is not limited to the above embodiment.

In the above embodiment, the shroud 37 covering the radiator 5 from a lateral side has been described as an example of the exterior member, but the present invention is not limited to this. For instance, the exterior member may be a cover for covering from a lateral side a main frame and a down frame in a saddle-type vehicle which is not provided with the radiator 5, and the cover may be supported by the hook-supporting section.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. An exterior member for a saddle-type vehicle having a frame comprising a head pipe and additional frame sections extending rearwardly from the head pipe, said exterior member comprising:
a main body portion including a front cover section and a rear cover section; and
a hook member formed on an inner side of the rear cover section of said main body portion;
wherein:
the vehicle further comprises a radiator,
the front cover section and rear cover section cooperate to form an airflow opening therebetween for guiding airflow induced by traveling of the vehicle towards the radiator,
said hook member is configured to hook onto the frame such that the exterior member is supported by the frame,
the exterior member is attached to the vehicle by hooking the hook member onto the frame, and
the hook is located behind the airflow opening in a longitudinal direction of the vehicle.

2. The exterior member for a saddle-type vehicle according to claim 1, wherein said additional frame sections comprise a pair of left and right main frames attached to the head pipe.

3. The exterior member for a saddle-type vehicle according to claim 2, wherein:
said vehicle further comprises a fuel tank;
each of the main frames includes a hook-supporting section formed on an upper edge portion thereof;
said fuel tank is disposed between the left and right main frames; and
said fuel tank is disposed above the hook-supporting section at which the hook member is engaged.

4. The exterior member for a saddle-type vehicle according to claim 3, wherein:
said exterior member has a plurality of fastening portions formed thereon;
the exterior member is supported by hooking onto the frame at the hook-supporting section and also supported by fastening to the vehicle through said plurality of fastening portions; and
the hook-supporting section is disposed substantially at a center of the plurality of fastening portions in an assembled state of the exterior member.

5. The exterior member for a saddle-type vehicle according to claim 4, wherein said vehicle further comprises a radiator provided inwardly of the exterior member in a vehicle width direction, and wherein the exterior member is fastened to the radiator and the fuel tank.

6. The exterior member for a saddle-type vehicle according to claim 3, wherein said vehicle further comprises a radiator provided inwardly of the exterior member in a vehicle width direction, and wherein the exterior member is fastened to the radiator and the fuel tank.

7. An exterior member for a saddle-type vehicle having a frame comprising a head pipe and additional frame sections extending rearwardly from the head pipe, said exterior member comprising a main body portion and a hook member formed on an inner side of said main body portion;
wherein:
said vehicle further comprises a fuel tank;
said additional frame sections comprise a pair of left and right main frames;
each of said main frames includes a hook-supporting section formed on an upper edge portion thereof;
said fuel tank is disposed above the hook-supporting section at which the hook member is engaged;
said hook member is configured to hook onto the frame such that the exterior member is supported by the frame, and the exterior member is attached to the vehicle by hooking the hook member onto the frame;
wherein:
said fuel tank has a recess formed on a side surface thereof; and
during assembly, the hook member is inserted between one of the main frames and the recess, and is slid along said one main frame.

8. The exterior member for a saddle-type vehicle according to claim 7, wherein in a mounted position thereof, said exterior member overlaps with the recess of said fuel tank when viewed in side view.

9. The exterior member for a saddle-type vehicle according to claim 8, wherein:
said exterior member has a plurality of fastening portions formed thereon;
the exterior member is supported by hooking onto the frame at the hook-supporting section and also supported by fastening to the vehicle through said plurality of fastening portions; and
the hook-supporting section is disposed substantially at a center of the plurality of fastening portions in an assembled state of the exterior member.

10. The exterior member for a saddle-type vehicle according to claim 8, wherein said vehicle further comprises a radiator provided inwardly of the exterior member in a vehicle width direction, and wherein the exterior member is fastened to the radiator and the fuel tank.

11. The exterior member for a saddle-type vehicle according to claim 7, wherein:
said exterior member has a plurality of fastening portions formed thereon;
the exterior member is supported by hooking onto the frame at the hook-supporting section and also supported by fastening to the vehicle through said plurality of fastening portions; and
the hook-supporting section is disposed substantially at a center of the plurality of fastening portions in an assembled state of the exterior member.

12. The exterior member for a saddle-type vehicle according to claim 7, wherein said vehicle further comprises a radiator provided inwardly of the exterior member in a vehicle width direction, and wherein the exterior member is fastened to the radiator and the fuel tank.

13. A saddle-type vehicle comprising:
a frame comprising a head pipe and a pair of left and right main frames attached to and extending rearwardly from the head pipe;
a fuel tank disposed between and above said main frames and having a recess formed on a side surface thereof; and
an exterior member having a hook member formed thereon;
wherein during assembly, the hook member is inserted between one of the main frames and the recess, and is slid along said one main frame.

14. A saddle-type vehicle according to claim 13 wherein:
each of the left and right main frames has a hook-supporting section formed on an upper edge portion thereof; and
the fuel tank is disposed on an upper side of the hook-supporting section at which the hook member is engaged.

15. A saddle-type vehicle according to claim 14, wherein the recess of the fuel tank overlaps with the exterior member in mounted position thereof, when viewed in side view.

\* \* \* \* \*